United States Patent
Horn et al.

(10) Patent No.: US 11,914,589 B2
(45) Date of Patent: Feb. 27, 2024

(54) EFFICIENT COMPUTATION OF ORDER BY, ORDER BY WITH LIMIT, MIN, AND MAX IN COLUMN-ORIENTED DATABASES

(71) Applicant: SAP SE, Walldorf (DE)

(72) Inventors: Oliver Horn, Nussloch (DE); Thomas Legler, Walldorf (DE); Robert Schulze, Walldorf (DE)

(73) Assignee: SAP SE, Walldorf (DE)

( * ) Notice: Subject to any disclaimer, the term of this patent is extended or adjusted under 35 U.S.C. 154(b) by 108 days.

(21) Appl. No.: 16/805,624

(22) Filed: Feb. 28, 2020

(65) Prior Publication Data
US 2021/0271676 A1   Sep. 2, 2021

(51) Int. Cl.
*G06F 16/24*   (2019.01)
*G06F 16/2453*   (2019.01)
*G06F 16/2455*   (2019.01)
*G06F 16/22*   (2019.01)

(52) U.S. Cl.
CPC ...... *G06F 16/24537* (2019.01); *G06F 16/221* (2019.01); *G06F 16/24556* (2019.01); *G06F 16/24557* (2019.01)

(58) Field of Classification Search
CPC .............................. G06F 16/24537
See application file for complete search history.

(56) References Cited

U.S. PATENT DOCUMENTS

| | | | |
|---|---|---|---|
| 9,965,500 B2 * | 5/2018 | Yoon | G06F 16/2456 |
| 2013/0325874 A1 * | 12/2013 | Weyerhaeuser | G06F 16/24554 |
| | | | 707/743 |
| 2014/0136473 A1 * | 5/2014 | Faerber | G06F 16/221 |
| | | | 707/607 |
| 2014/0244628 A1 * | 8/2014 | Yoon | G06F 16/245 |
| | | | 707/722 |
| 2015/0324399 A1 * | 11/2015 | Tyercha | G06F 16/29 |
| | | | 707/792 |
| 2015/0363167 A1 * | 12/2015 | Kaushik | G06F 16/221 |
| | | | 707/753 |
| 2016/0147786 A1 * | 5/2016 | Andrei | G06F 16/2358 |
| | | | 707/695 |
| 2016/0147814 A1 * | 5/2016 | Goel | G06F 16/2336 |
| | | | 707/638 |

(Continued)

OTHER PUBLICATIONS

Buettcher, S. et al., "Information Retrieval: Implementing and Evaluating Search Engines," 2010.

(Continued)

*Primary Examiner* — Mohammad S Rostami
(74) *Attorney, Agent, or Firm* — Mintz Levin Cohn Ferris Glovsky and Popeo, P.C.

(57) ABSTRACT

In some example embodiments, there may be provided a method including detecting a query operator of a predetermined type requiring a sorting or a scanning responsive to the query operator at a column-oriented database; determining a sorted dictionary at the column-oriented database is eligible for direct access by at least checking that the column-oriented database provides sorted dictionary access and that dictionary collation and a collation of the query operator are the same; when the sorted dictionary is eligible, reading directly from the sorted dictionary a batch of sorted values; and processing, based on the batch sorted values read from the sorted dictionary, the query operator.

20 Claims, 6 Drawing Sheets

(56) References Cited

U.S. PATENT DOCUMENTS

| | | | |
|---|---|---|---|
| 2016/0239527 A1* | 8/2016 | Jang | G06F 16/2228 |
| 2016/0283558 A1* | 9/2016 | Wu | G06F 16/24575 |
| 2017/0091239 A1* | 3/2017 | Bumbulis | G06F 16/245 |
| 2017/0147618 A1* | 5/2017 | Geissinger | G06F 16/25 |
| 2018/0018375 A1* | 1/2018 | Brunel | G06F 16/284 |
| 2018/0018383 A1* | 1/2018 | Brunel | G06F 16/282 |
| 2018/0150494 A1* | 5/2018 | Schulze | G06F 16/221 |
| 2018/0246809 A1* | 8/2018 | Rebholz | G06F 16/901 |
| 2018/0336229 A1* | 11/2018 | Muehle | G06F 16/245 |
| 2019/0347209 A1* | 11/2019 | Seifert | G06F 12/0646 |
| 2020/0081841 A1* | 3/2020 | Samynathan | G06F 12/0859 |

OTHER PUBLICATIONS

Krueger, J. et al., "A Case for Inverted Indices for In-Memory Databases," Fourth International Conference on Advances in Databases, Knowledge, and Data Applications. 2012.

Powers, D.M.W., "Parallelized Quicksort and RadixSort with Optimal Speedup," Proceedings of the International Conference on Parallel Computing Technologies. Novosibirsk. 1991.

Rao, J. et al., "Making B+—trees cache conscious in main memory," SIGMOD '00 Proceedings of the 2000 ACM SIGMOD International Conference on Management of Data. 2000.

Tsigas, P. et al., "A Simple, Fast Parallel Implementation of Quicksort and its Performance Evaluation on SUN Enterprise 10000," Parallel, Distributed and Network-Based Processing. 2003.

Williams, J.W.J., "Algorithm 232: Heapsort," Communications of ACM. ACM 7, 347-348, 1964.

\* cited by examiner

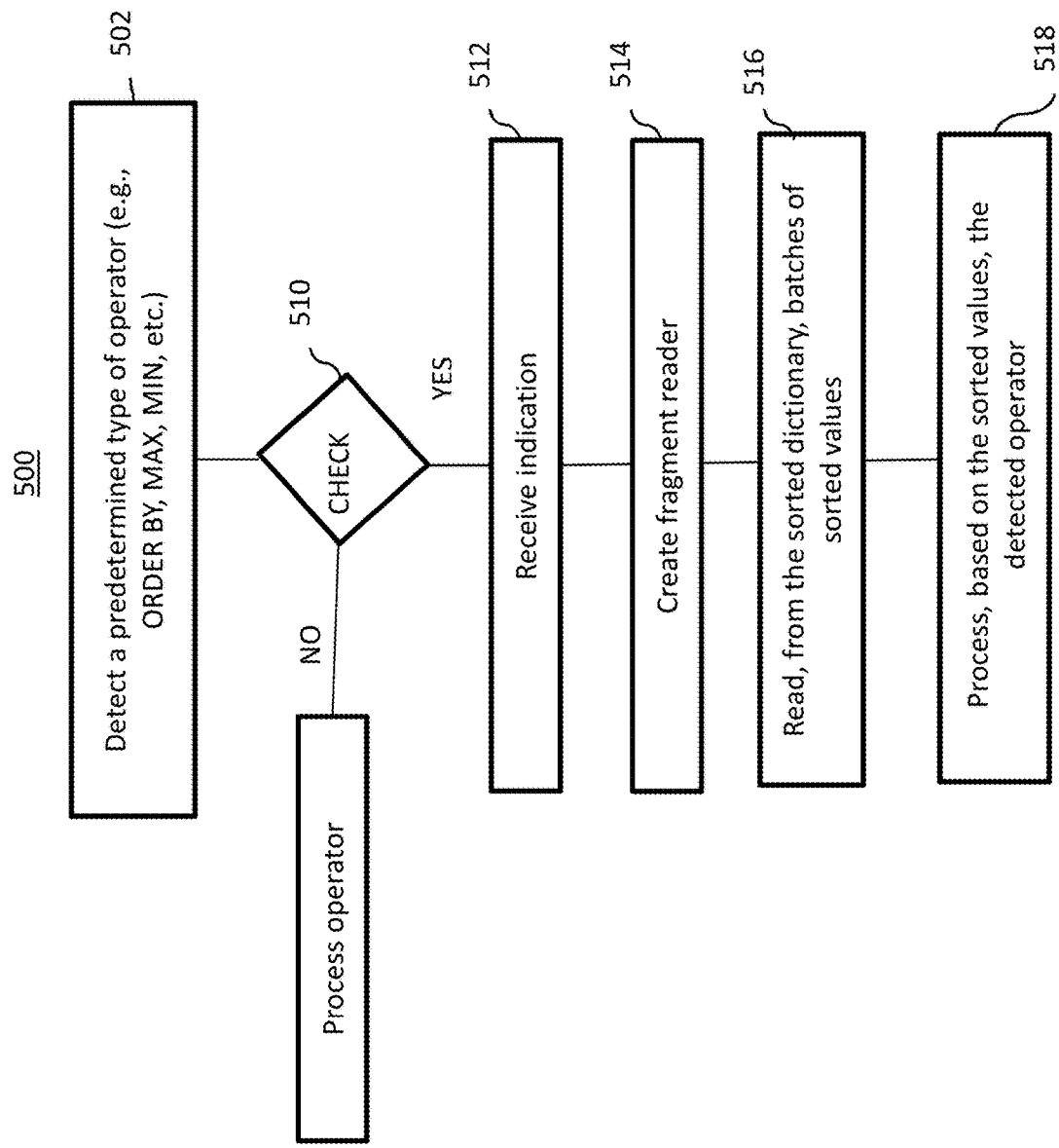

EFFICIENT COMPUTATION OF ORDER BY, ORDER BY WITH LIMIT, MIN, AND MAX IN COLUMN-ORIENTED DATABASES

TECHNICAL FIELD

This disclosure relates generally to data processing and, in particular, to query execution optimization.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance

SUMMARY

In some example embodiments, there may be provided a method including detecting a query operator of a predetermined type requiring a sorting or a scanning responsive to the query operator at a column-oriented database; determining a sorted dictionary at the column-oriented database is eligible for direct access by at least checking that the column-oriented database provides sorted dictionary access and that dictionary collation and a collation of the query operator are the same; when the sorted dictionary is eligible, reading directly from the sorted dictionary a batch of sorted values; and processing, based on the batch sorted values read from the sorted dictionary, the query operator.

In some variations, one or more of the features disclosed herein including the following features can optionally be included in any feasible combination The predetermined type of query operator may include at least one of an order by, an order by with limit, an order by with top k smallest, an order by with top k largest, a minimum, and a maximum. The column-oriented database may include a main fragment storing a column of data values as a data vector, the sorted dictionary, and an inverted index. The column-oriented database may include a delta fragment, a delta fragment sorted dictionary, a search tree, and a delta fragment inverted index. The query operator may be detected as part of query optimization. The checking that the column-oriented database provides sorted dictionary access and that dictionary collation and the collation of the query operator are the same may include a call to a fragment of the column-oriented database and a response to the call indicating the column-oriented database is eligible. The reading from the sorted dictionary the batch of sorted values may include storing a last, or a next, value read from the sorted dictionary to enable a second batch read of the sorted dictionary. The reading directly from the sorted dictionary may enable avoiding, in response to the query operator, a sort or a scan of a fragment at the column-oriented database.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 is an example of a process, according to some implementations of the current subject matter.

DETAILED DESCRIPTION

Figure 1A:
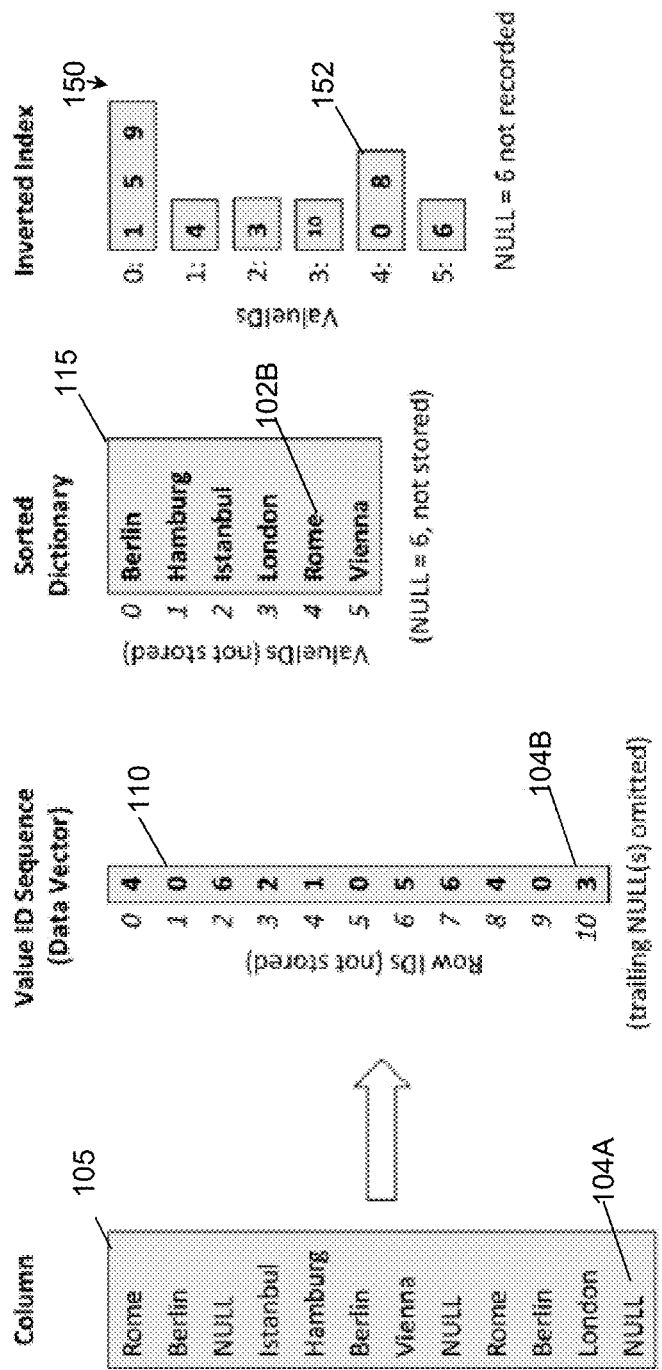
FIG. 1A illustrates an example of a main fragment of a column-oriented database, according to some implementations of the current subject matter.

Sorting intermediate results obtained from a database can be one of the most time-consuming processing steps in SQL plan execution. In some databases including in-memory databases and/or in-memory column-oriented relational database systems (e.g., SAP HANA) various computationally efficient and parallel generic sorting algorithms may be used, examples of which include a quick sort algorithm and heap sort algorithm. These sorting algorithms may be used to speed up sorting. However, sorting not only has a high central processing unit (CPU) consumption, but sorting also exposes memory access patterns which may be ill suited to modern computer processors. As such, a database may often avoid sorting operations to the extent possible (or at the very least attempt to reduce the sorting effort to a minimum).

The subject matter disclosed herein considers two common classes of database operations that are solved by sorting. The first is to return the top k smallest or top k largest elements for a set of values, such as domain coded values. Table 1 below depicts an SQL representation of the top k values being returned. For example, if the ORDER BY is set as ascending (ASC), the ORDER BY returns the result set in an ascending order. And, if the top k (where k is 3) is performed, the 3 smallest values are returned. Likewise, if the ORDER BY is descending (DESC) and the top k (where K is 3) is performed, the 3 largest values are returned. The "LIMIT" can be used to limit the quantity of values in the sorted, result set.

TABLE 1

SELECT ... ORDER BY ... ASC/DESC
SELECT TOP K ... ORDER BY ... ASC/DESC
SELECT ... ORDER BY ... ASC/DESC LIMIT ...

The second class of database sorting being address herein relates to returning a minimum element (e.g., MIN) or a maximum element (e.g., MAX) from a set of values, such as domain-coded values. In SQL, this would take the following form: SELECT MIN( . . . ) or SELECT MAX( . . . ). In the case of a MIN or MAX, a sorting may not be used but instead the rows of a table are scanned to find the minimum or the maximum.

In some embodiments disclosed herein, the explicit sorting step and/or table scan required to compute an ORDER BY, ORDER BY with LIMIT, MIN, or MAX can be omitted. In some embodiments, the requested result set for ORDER BY, ORDER BY with LIMIT, MIN, or MAX may be retrieved directly by exploiting the columnar, value-ID based data layout used in some databases, such as column-oriented databases. The phrase "column-oriented database" refers to a database management system configured to store data tables by column rather than by row. The column-oriented database may be better suited for responding to queries (when compared to a row-oriented database) as the column-oriented database is able to precisely access the data responsive to the query. The column-oriented database may store some if not all of the data in-memory, although a persistent store may be used as well.

In some implementations, exploiting the columnar, value-ID layout of the column-oriented database may enable returning values much more efficiently than existing, generic sorting algorithms. In some implementations, the expensive unpacking of values from a dictionary is avoided, and values are read chunk-wise without having to sort or scan all the values of a given table, no sorting algorithm with high inherent cost is executed, and/or early cancellation when the desired number of result rows is reached becomes trivial. In other words, the systems and methods disclosed herein may significantly reduce the required processing load (e.g., CPU time) for a certain subclass of database operations such as ORDER BY, ORDER BY WITH LIMIT, MIN, and MAX (all of which can require expensive sorting). And, these systems and methods may not only speed up queries, but may contribute to the general scalability and efficiency of the database system.

In a column-oriented database (also referred to as a column-store database), the values in the column may be compressed using a dictionary. As the values in a column may be of a similar type (e.g., a column of cites, a column of countries, a column of amounts), the dictionary may provide meaningful compression, when compared to row-oriented database where the values in a row can be dissimilar. FIG. 1A depicts an example of the columnar, value-ID-based storage layout employed in some column-oriented databases. The data vector 110 represents the values 105 encoded using the dictionary 115 and then stored in the column-oriented database. For example, the value "Rome" 102A is encoded using the dictionary value ID "4" 102B. The other values, such as Berlin, NULL, Istanbul, Hamburg, etc. are also encoded using the dictionary 115. The column 105 can thus be stored as the data vector 110. In the example of FIG. 1A, NULL values are encoded using the dictionary 115 but may not be stored, although they can be stored as well. The inverted index 150 maps each value ID to a list of row ids (which represent row positions) in the data vector 110 that contain the value ID.

A database, such as a column-oriented database, may include a read-optimized main fragment, which may be hold the majority of the data, and a small write-optimized delta fragment. When this is the case, values (e.g., data records) may be initially inserted (or updated) to the end of the delta fragment that is optimized for writing. However, a query may need to execute on both the main fragment and the delta fragment, in which case the corresponding results are merged after, for example, applying rules or filters such as row visibility rules. The delta merge operation may create a new main fragment from tuples in the current main fragment and from committed changes in the current delta fragment.

Figure 1B:
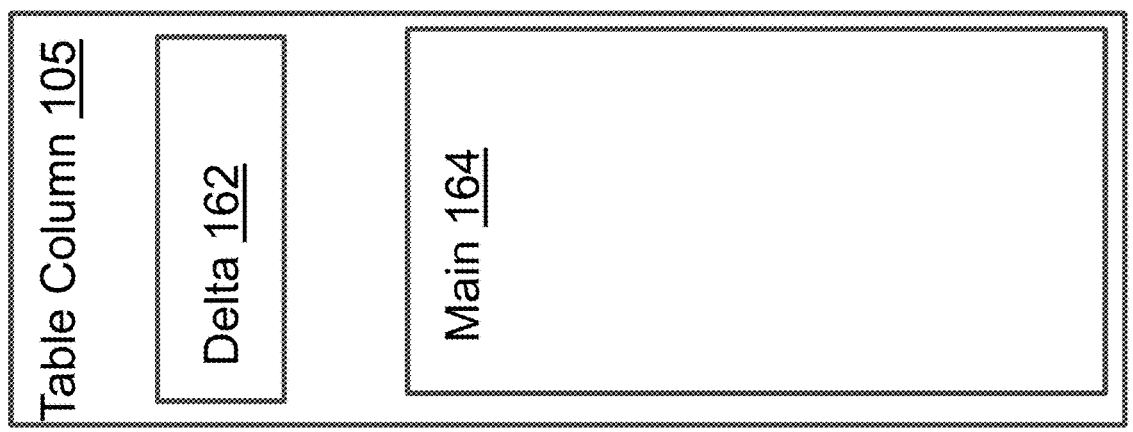
FIG. 1B illustrates an example a column-oriented database including a main fragment and a delta fragment, according to some implementations of the current subject matter.

FIG. 1B depicts an example of a delta fragment 162 of a column store database and a main fragment 164 of the column store database, both of which are associated with table column 105. The column store main fragment 164 may include most if not all of the data of the column 105 (or, if partitioned, of that columnar partition), and the delta fragment 162 contains newly-written data which has not yet been merged into the column store's main fragment 164. Although only a single column, delta fragment, and main fragment are shown to simplify the explanation, the column-oriented database may include additional fragments and columns.

Referring again to FIG. 1A, the phrase "domain-coded" refers to whether the values in the column, such as column 105, are substituted by the value IDs from a dictionary, such as dictionary 115. In other words, the main and delta fragments may be domain-coded by having the column values substituted by value IDs that map to the dictionary storing the distinct original column values. Since values are identified with value IDs in domain coding, the computation of a sorted sequence of domain-coded values is another way of saying the computation of a sorted sequence of value IDs.

At FIG. 1A, the main fragment stores a representation of column 105 which in this example contains 9 rows of values with city names and three rows with NULL values. From the column, the dictionary 115 is a list of unique column values, and this list of unique values is sorted. The position of each value (which in this example is a city name or NULL) in the dictionary 115 maps to a unique value ID. The value ID may be considered transient in the sense that it may not explicitly stored but calculated from the row position of a given value. In the example of FIG. 1A, Berlin is assigned value ID 0, Hamburg is assigned value ID 1, and so forth. In the example of FIG. 1A, NULL is not stored in the sorted dictionary 115, but NULL is implicitly mapped to a certain value ID, such as the size of the dictionary (e.g., value ID dictionary. size( ) which in this example is 6).

Using the dictionary 115, the column 105 of cities may be represented as sequence of value IDs (e.g., the sequence forming the data vector 110). In some instances, any trailing NULLs (such as the 12th NULL at column 104A) may be pruned from the end of the data vector so the last value in the data vector is "3" 104B (which corresponds to London rather than "6" which corresponds to NULL). Operations such as a search may reconstruct trailing NULLs from the length of the original column (that is stored as a separate integer) and the length of the data vector.

The dictionary 115 and the data vector 110 may provide a memory efficient and self-contained representation of the original column 105. However, to improve performance of value lookups in a value-ID-based storage layout, an inverted index 150 may be used as an auxiliary data structure. The inverted index maps each value ID to a list of row ids (which represent row positions) in the data vector that contain the value ID.

To illustrate with reference to FIG. 1A, the inverted index 150 is generated from the data vector 110. To obtain the row positions of the column value 'Rome' (which has value ID 4 per the sorted dictionary 115) based on the inverted index for example, the value ID 4 in the inverted index lists two row positions 152 so the value ID "4" would return row positions "0" and "8" of the data vector 110. The generated inverted index may not include information about row positions of the NULL values (which in this example has a value ID 6), although the data vector may include row positions that contain the NULL value ID.

The dictionary 115 of the main fragment may, as noted, be sorted. In other words, the dictionary may be ordered according to a given criterion (or criteria), such as case-sensitive collation (e.g., A, B, C, a, b, c, etc.) or case-insensitive collation (A, a, B, b, C, c, etc.). In some embodiments, the type of sort collation of the SQL query should match the sort collation of the dictionary. The sort collation of the SQL query and the dictionary may match if sort collation was not explicitly specified in SQL, but the dictionary values happen to be implicitly sorted according SQLs default collation (e.g., which may be for example case sensitive). In some databases, this might be the case if the dictionary values consist of only lower-case characters (e.g. 'bdb', 'edw', 'fdd', . . . ), only upper-case characters (e.g. 'CMA', 'GER', 'ME', . . . ), or of only numeric characters ('4256', '674', '901', . . . ), for example.

Alternatively, or additionally, the sort collation of the SQL query and the dictionary may match if the sort collation was explicitly specified in SQL and the specified collation is the same (e.g., equals) as the collation of the dictionary (e.g., ORDER BY . . . LOCALE "CASE INSENSITIVE"). This may occur quite often in practice, for example when (1) sorting was requested in SQL only to provide results in an unambiguous manner and/or when (2) one is only interested in chunks (e.g., a windows of N consecutive sorted rows) rather than in all sorted rows of a column. The former (1) implies that an arbitrary sort criterion is chosen (e.g., case-insensitive collation which is the dictionary default collation), and the latter (2) enables omitting the expensive internal sorting step in accordance with some embodiments. This scenario (which at least omits the expensive internal sorting step) maps to SQL shown at the example of Table 1 (e.g., the OFFSET of 10 and LIMIT of 5 returns a chunk of data for rows 11 to 15 of the column).

TABLE 1

Figure 2:
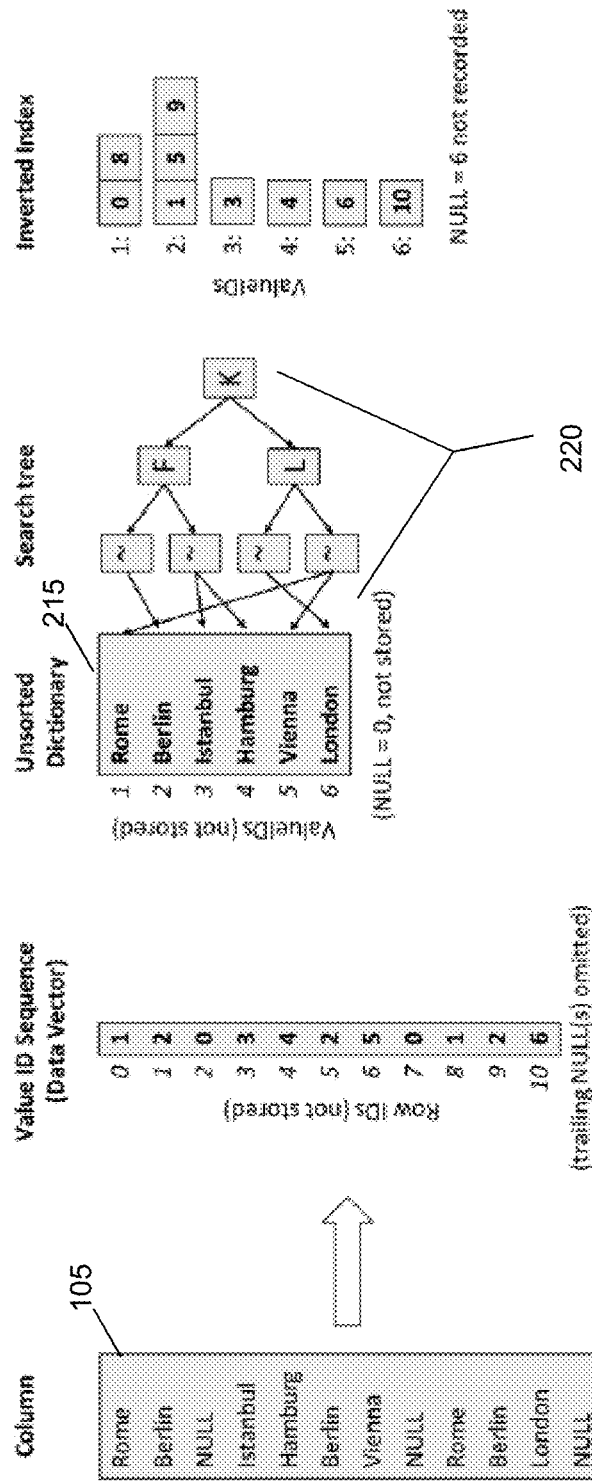
FIG. 2 illustrates an example of a delta fragment of a column-oriented database, according to some implementations of the current subject matter.

SELECT COUNTRY, CITY
FROM CITY_LIST
WHERE CITY LIKE "New %"
    ORDER BY COUNTRY LIMIT 5 OFFSET 10 -- return
    sorted rows 11 to 15
LOCALE = "CASE_INSENSITIVE" -- custom sort collation FIG. 2 depicts the column 105 of FIG. 1 but encoded in the delta fragment. The data representation is generally similar to the main fragment depicted at FIG. 1, but the (1) dictionary 215 for the delta fragment is unsorted as the entries are as noted write optimized (e.g., append-only to enable fast insertion of new values) and the (2) NULL value IDs in the delta fragment has a predetermined value (e.g., 0) rather than a value based on the dictionary size as in the main fragment at FIG. 1.

The loss of dictionary 215 being sorted may severely impact query performance. For example, the "value" to "value-id" translation (which occurs in SQL WHERE filter evaluation, for example) may no longer be implemented using a binary dictionary search but instead the dictionary 215 is scanned row-by-row to find matching value IDs. To address this impact, the delta fragment's dictionary 215 may include an auxiliary search tree 220 structure (or, for example, a similar helper structure) to provide a sort order over the dictionary. This structure, such as search tree 220, may provide sorted access to dictionary values in logarithmic time. For the sake of simplicity of explanation, FIG. 2 shows the auxiliary search tree 220 implemented as a binary search tree 220, although other types (including more complex) of optimized search tree structures (e.g., cache-conscious B+-trees and the like) may be used as well. An example of a B+ tree is described at J. Rao et al., Making B+-trees cache conscious in main memory," SIGMOD '00 Proceeding of the 2000 ACM SIGMOD International Conference on Management of Data, 2000.

In the example of FIG. 2, auxiliary search tree 220 (which in this example is a binary search tree) first divides the dictionary 215 values into values that begin with a character smaller than "K" and values beginning with a character bigger than "K." The next layer of the tree 220 divides the two partitions further into values that begin with a character smaller or larger than "F", respectively smaller/larger than "L". The leaf nodes in the last layer of the tree 220 finally only contain pointers to the dictionary entries that fulfil the partition criteria of the corresponding branch leading to the leaf node.

To avoid the expensive sorting step used some top-k ORDER BY, MIN( ), or MAX( ) operations as noted above, in some embodiments, the column-oriented data layout may be exploited to obtain sorted values directly. As noted, calculating a full sort order might become very expensive. On the other hand, looking for top k values may likely find k results by looking for only the first values with respect to the sort order. In some embodiments, the ordering of values (which are probably not relevant for the results) or scanning of a complete table may be skipped. In some embodiments, a process may be used to provide the result set for TOP k, ORDER BY, MIN( ), or MAX( ) bulk-wise and doing a sort or scan only if needed.

Sorted Dictionary Reader API

In some embodiments, there is provided a sorted dictionary reader API to retrieve sorted values from the main fragment and the delta fragment. First, a physical plan operator may be included in a query plan to determine whether the fragment is eligible for direct retrieval of sorted values. For example, when a query plan is generated, the eligibility check (e.g., whether the fragment is eligible for direct retrieval of sorted values) may be performed. In some embodiments, this eligibility check is performed as part of query optimization. For example, the sorted dictionary API may perform an eligibility check a column to determine whether there is provided some form of sorted dictionary access. This eligibility check may also check to confirm that the collation of the SQL query and the dictionary are the same. If the fragment of the column is eligible (e.g., the dictionary sorting and the SQL collation are the same), the sorted dictionary reader API returns an indication that the fragment of the column is eligible to retrieve batches of sorted values from the fragment.

In some embodiments, there is provided, as noted, an eligibly check. For example, a method may be provided to check a fragment to see if it is eligible, as noted. To illustrate further, the method may take the form of "SortedDictionaryAccessFor( )" that checks whether direct retrieval of sorted values from a fragment is possible. The following is an example form:

virtual bool provides SortedDictionaryAccessFor(const Collation& collation)=0.

The method is passed the collation of the SQL query as input parameter (e.g., the SQL default locale "CASE SENSITIVE" if specified differently in SQL). If the fragment determines that it is able to provide fast batch access to sorted values (e.g., in the main fragment because the sorted dictionary 115 locally matches the input collation) the method returns true, else it returns false. If the fragment has no dictionary (because it is not domain-coded), the method, providesSortedDictionaryAccessFor( ), may throw an exception.

As noted, if the fragment is eligible for direct retrieval of sorted values, the caller may be provided a sorted value reader object from the fragment, an example of which is shown at Table 2.

TABLE 2

```
enum class Sorting
{
Ascending,
Descending
};
virtual unique_ptr<SortedDictionaryReader>
createSortedDictionaryReader( Sorting sorting)= 0
```

The sorting "enum" specifies the direction of sorting (e.g., ascending or descending). The createSortedDictionaryReader( ) returns a SortedDictionaryReader object which exposes the API shown at Table 3.

TABLE 3

```
class SortedDictionaryReader {
public:
virtual void getNext(
size_t count,
std::vector<ValueId>& result) = 0;
};
```

At Table 3, the method getNext( ) of SortedDictionaryReader returns the next count and many sorted value IDs in the vector result according to the chosen sorting (ascending or descending). As preconditions, the count may need to be greater than "0" (e.g., ">0") and the result vector (which was passed in) may need to be empty. Implementations of getNext( ) may return fewer than the requested count and many value IDs if and only if the difference between the current fragment dictionary size and the total number of value IDs returned by previous invocations of getNext( ) is smaller than count. This situation is considered a stop criterion, iteration has finished at that point, and any further invocations of getNext( ) are required to return no value IDs.

To illustrate given a main (sorted) fragment dictionary (as noted with respect to 115 at FIG. 1A) having seven entries: 0=Aa, 1=Bb, 2=Cc, 3=Dd, 4=Ee, 5=Ff, 6=Gg. The following is an example of an allowed sequence of invocations of SortedDictionaryReader(ascending)::getNext( ):

1. getNext(count=3)—*returns value IDs 0, 1, 2.
2. getNext(count=2)—*returns value IDs 3, 4.
3. getNext(count=3)—*returns value IDs 5, 6. (Note that the difference between the current dictionary size (7) and the total number of value IDs returned by previous invocations (5) was smaller than count (3). getNext( ) thus only returns the remaining two value IDs. Iteration has finished at this point).
4. getNext(count=3)—*returns no value IDs.

Each invocation of getNext( ) operates on the current physical state of the fragment at the time getNext( ) is called. A fragment may receive updates in parallel (e.g., inserts, modifications, or deletes of tuples), and therefore the current physical fragment state might be different from the physical state of the fragment at the time the SortedDictionaryReader object was created. And in some databases, this may be especially relevant for delta fragments, which are the target of parallel writes. In the face of parallel writes, getNext( ) may only be useful if the caller checks the visibility of the rows associated with the returned value IDs with respect to the transactional visibility at the time the reader object was created.

The following provides an example of a database including at least one main fragment and at least one delta fragment, and how the main and delta fragments may implement the SortedDictionaryReader API.

As noted with respect to FIG. 1A, the dictionary 115 of main fragment may already be sorted. As such, the getNext( ) may thus simply return an ascending, respectively descending list of generated value IDs 0, 1, 2, and so forth. Referring to FIG. 1A, if the MIN is needed for example, the sorted dictionary 115 may be accessed to provide the value ID "0" corresponding to Berlin (which is found at rows 1, 5, and 9 of the data vector 110. Likewise, if the MAX is needed for example, the sorted dictionary 115 may be accessed to provide the value ID "5" corresponding to Vienna (which is found at row 6 of the data vector 110). The ORDER BY, ORDER BY with LIMIT can also be executed like MIN and MAX to avoid sorts by accessing the information which can be obtained from the sorted dictionary 115.

An implementation of a main SortedDictionaryReader with ascending sorting is shown at Table 4.

TABLE 4

```
template <Sorting SortingT>
class MainSortedDictionaryReader : public SortedDictionaryReader
public:
MainSortedDictionaryReader(size_t dictSize);
void getNext(
size_t count,
std::vector<ValueId>& result) override;
private:
const size_t m_dictSize; // dictionary size
   ValueId m_currentVid; // the current value ID, initially 0
   bool m_done{false}; // true if the stop criterion is reached
};
// constructor implementation:
template <>
MainSortedDictionaryReader<Sorting::Ascending>::MainSortedDictionaryReader
                                                                         (
size_t dictSize)
: m_dictSize{dictSize}
, m_currentVid{0}
{
}
template <>
void MainSortedDictionaryReader<Sorting::Ascending>::getNext(
size_t count,
std::vector<ValueId>& result)
```

TABLE 4-continued

```
{
if (m_done) {
return; // done, return nothing
}
const size_t requestedCount{count};
while ((m_currentVid < m_dictSize) && (count != 0)) {
result.emplace_back(m_currentVid);
++m_currentVid;
--count;
}
if (std::size(result) < requestedCount) {
m_done{true};
}
}
```

However, in the case of the delta fragment which includes an unsorted dictionary 215, the getNext( ) may iterate via the auxiliary search tree ("Btree") 220 to retrieve sorted value IDs. To remember the position of the iteration in the tree 220, a state is stored between invocations of getNext( ) (which is similar to the variables m_done and m_currentVid in above snippet for Main). In some implementations of the getNext( ) the getNext( ) does not block parallel database update operations of the delta fragment, which as noted is write optimized for frequent writes.

In some implementations of the getNext( ) the getNext( ) supports both order directions (e.g., ascending and descending sort) in the delta fragment. While an ascending order may be considered easier to provide, reading backwards may be expensive with respect to resources. This may be especially important due to the fact that for example the search tree (e.g., tree 220) may store values block-wise. As long as the predecessor is in the same block, reading the previous value is cheap. The reading and calculating the predecessor from another block may be much more expensive, but this situation fits well to the bulk approach of the SortedDictionaryReader. If a value was read from the tree 220, the SortedDictionaryReader may provide some of its predecessors without additional costs if these are stored in the same block (e.g., chunk). Under the assumption that these values satisfy the original top k query, additional values do not need to be resolved which saves effort with respect to the sorting. The state may be stored by keeping the last value read. Locks on the blocking parallel operations may be released so long as delta fragment is only losing values until the next bulk runs.

If calls of getNext( ) are able to provide the requested total number of results, the query execution may stop, and the SortedDictionaryReader may be released along with any locks involved with the reader. If more sorted values are required, another call to the attribute is performed to ask for more values. When this is the case, relevant locks may be required again (e.g., as with the first call) and the SortedDictionaryReader (including the stored state from the first call such as the last value provided by the first call) is used for the getNext( ) value lookup. Using this value, a search may be performed for the value in the tree 220 and the predecessor of this value may be calculated (which may include expensive operations like complex traversals of the tree). If the predecessor is found, all other values in this block may be used to provide another block of values at once to the SortedDictionaryReader. If more values are still required, this process may repeat until all of the required sorted values are found form the dictionary (in which case execution can stop).

Figure 3:
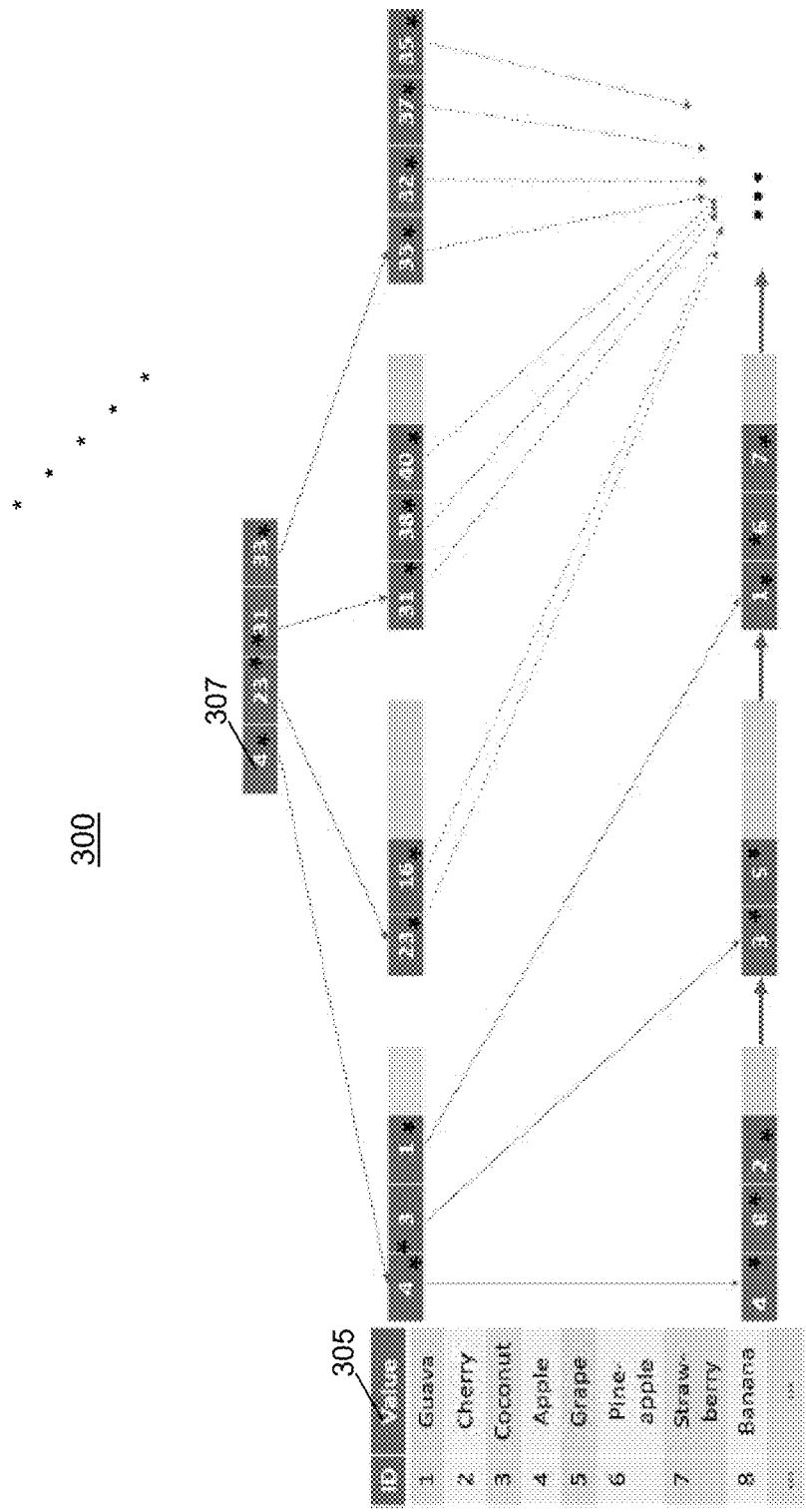
FIG. 3 illustrates an example of a search tree used with an unsorted dictionary of the delta fragment, according to some implementations of the current subject matter.

FIG. 3 depicts an example of a tree 300, which may be used as the structure of the tree 220 of FIG. 2. The tree 300 comprised a cache sensitive, CSB+ tree. In the example of FIG. 3, the tree 300 stores values which have been dictionary encoded 305. The numbers 4, 23, 31, and 33 for example reference values from the dictionary 305. For example, the number 4 (at 307) refers to "Apple" as indicated by the dictionary. The boxes represent blocks of memory storing multiple values. The box with an asterisk (*) means "used" and the numbers represent the first number of the block on the next level. A box without an asterisk means "not used." The last level represents the tree-leaf-nodes, representing the sorted values of the dictionary. These leaf nodes are connected to allow fast traversal in increasing order. If a value is found, the other values in the same node may be read. For example, searching Pineapple (which has an ID of 6) also provides Guava (1) and Strawberry (7) as direct neighbors. If more than one predecessor of "Pineapple" is required, the lookup can become more expensive due to a re-traversal of the tree providing the node with "Coconut" (3) and "Grape" (5).

When an operator in a query plan (e.g., physical plan operator) corresponds to ORDER BY, ORDER BY with LIMIT, MIN, or MAX, a SortedDictionaryReader may be generated to read the sorted dictionary, such as sorted dictionary 115 of the main fragment. Alternatively, or additionally, an InvertedIndexLookupReader may also be generated to read an inverted index 150 of the main fragment.

In the case of ORDER BY, if the ORDER BY has a top k restriction (e.g., a LIMIT on results returned or a top k results to be returned), the plan operator may be initialized with "k" as the number of values (or rows from the column's fragment) to retrieve. If there is no limit, k can be set to the number of rows in the column fragment. For MIN or MAX, the limit may be set to 1.

As long as not all requested k sorted rows are retrieved, the physical query plan operator may repeatedly ask the SortedDictionaryReader for a new block of i<k value IDs from the sorted dictionary using, for example, getNext( ). For each value ID in the block, the InvertedIndexLookupReader may be used to determine the rows (e.g., in the column 105 or in data vector 110) which contain the value ID. For each row, a visibility check may be performed by, for example, removing rows that are not supposed to be visible according to the transactional visibility at the beginning of plan operation. The visibility of rows may be determined from a separate data structure associated with the database but not part of the fragment dictionary, data vector, or inverted index. If a row is visible, the row (and its value) is added to the result set, in which case k can be decremented by 1.

To process ORDER BY statements, the physical query plan operator may be configured to handle rows containing NULLs (e.g., unknown value). Each fragment type (e.g., main or delta) may, as noted, have a specific NULL value ID and in some cases, as noted, the NULLs are also not part of the inverted index. If getNext( ) returns a NULL, a data vector scan may have to be performed. As long as there are remaining rows, the data vector may be scanned for rows that contain the NULL value ID. If such row is visible, it is added to the result and the number of remaining rows is decremented. In SQL for example, it can be specified whether NULLs are sorted before all other non-NULL rows or sorted after all other non-NULL rows (e.g., "NULLS FIRST"/"NULLS LAST"). Depending on what was specified, found NULL rows may be prepended or appended to all other non-NULL sorted rows. For MIN and MAX, the NULL-handling can be skipped. If there are no remaining rows either the top-k has been reached and further scanning of this fragment can be stopped or the fragment is fully scanned.

In some databases, such as a column store database, a column may include at least two fragments, a main fragment and a delta fragment. And, there may be one plan operator per fragment. The results of the main fragment's plan operator and the delta plan's operator may be merged. Because the per-fragment results are sorted, a merge sort algorithm may be applied to union both partial results. If a top-k limit exists, the sorted merge stops when k rows are merged into the final result. For a TOP 1 ORDER BY or MIN or MAX the one result row of each fragment needs to be compared with each other to find the row with the overall lowest or highest value.

Figure 4:
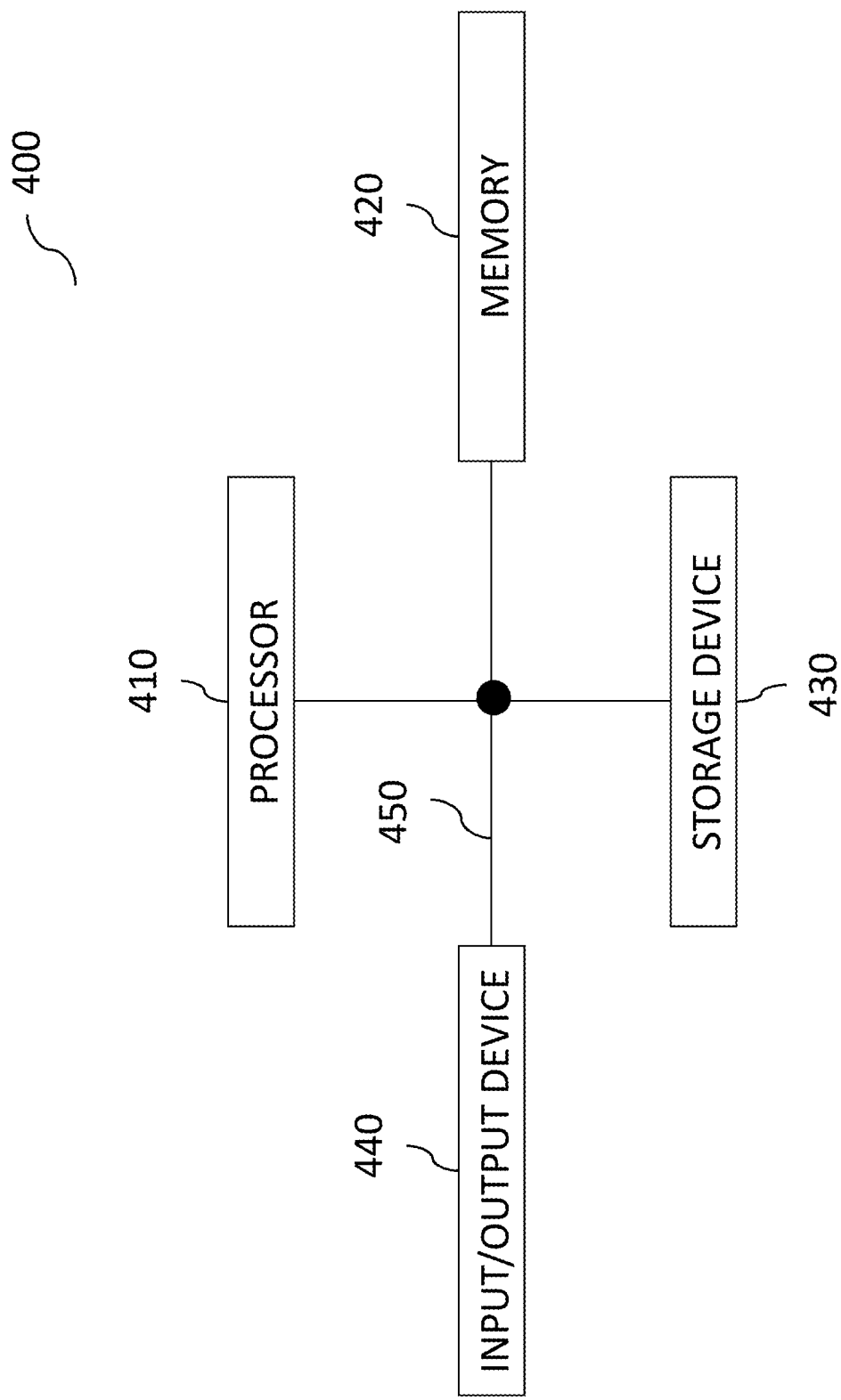
FIG. 4 is an example of a system, according to some implementations of the current subject matter.

In some implementations, the current subject matter can be configured to be implemented in a system 400, as shown in FIG. 4. The system 400 can include a processor 410, a memory 420, a storage device 430, and an input/output device 440. Each of the components 410, 420, 430 and 440 can be interconnected using a system bus 450. The processor 410 can be configured to process instructions for execution within the system 400. In some implementations, the processor 410 can be a single-threaded processor. In alternate implementations, the processor 410 can be a multi-threaded processor. The processor 410 can be further configured to process instructions stored in the memory 420 or on the storage device 430, including receiving or sending information through the input/output device 440. The memory 420 can store information within the system 400. In some implementations, the memory 420 can be a computer-readable medium. In alternate implementations, the memory 420 can be a volatile memory unit. In yet some implementations, the memory 420 can be a non-volatile memory unit. The storage device 430 can be capable of providing mass storage for the system 400. In some implementations, the storage device 430 can be a computer-readable medium. In alternate implementations, the storage device 430 can be a floppy disk device, a hard disk device, an optical disk device, a tape device, non-volatile solid state memory, or any other type of storage device. The input/output device 440 can be configured to provide input/output operations for the system 400. In some implementations, the input/output device 440 can include a keyboard and/or pointing device. In alternate implementations, the input/output device 440 can include a display unit for displaying graphical user interfaces.

FIG. 5 illustrates an exemplary method 500 for executing an operation in a database system, according to some implementations of the current subject matter.

At 502, an operator may detected that is of a given type which requires sorted data. For example, the operator may be an ORDER BY, ORDER BY with LIMIT, ORDER BY TOP k, MAX, MIN, and the like. As noted, these operators include table sorts (or entire table scans or reads) which may be reduced or avoided all together by accessing the sorted dictionary of a column-store database.

For the detected operator, a check may be performed at 510 of the fragment to determine whether the fragment allows (or includes) sorted dictionary access and whether the collation of the operation, such as a query, is the same as the collation of the dictionary in the fragment. For example, a sorted dictionary API may perform an eligibility check of a column to determine whether there is provided some form of sorted dictionary access. This eligibility check may also check to confirm that the collation of the query and the dictionary are the same.

If the fragment of the column is eligible (yes at 510), an indication may be received at 512 to indicate that this is the case. For example, the sorted dictionary reader API may return an indication that the fragment of the column is eligible and able to provide sorted values (which may be read in batches such as block-wise) from the fragment. If however the fragment of the column is not eligible (no at 510), the operator, such as the ORDER BY etc., is processed normally without the benefit of being able to directly access the sorted dictionary to reduce sorting as disclosed herein.

At 514, a reader may be created to read the fragment. An example of a reader is described at Table 2. The created reader may read, at 516, the value IDs from the sorted dictionary and return those values in a sorted form. Moreover, the created reader may read a batch of value IDs from a dictionary for a given fragment. When this is the case, the reader may return and store the next value to be read from the dictionary, so if reading is performed again the reader knows where to start reading again. The method getNext( ) of SortedDictionaryReader is example of a reader which returns the next count and many sorted value IDs in the vector result according to the chosen sorting (ascending or descending).

At 518, the returned sorted values are used to process the detected operator. For example, the returned sorted values may be used for the ORDER BY TOP 3 to provide the top 3 sorted values. This result may be used as part of the response to a query including the detected operator.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method comprising:
    detecting, by one or more processors, at a column-oriented database comprising a main fragment and a delta fragment, a query operator of a predetermined type requiring a sorting of a column of the column-oriented database and a scanning of the column of the column-oriented database in order to determine a response to the query operator, wherein the predetermined type of query operator comprises at least one of an order by, an order by with limit, an order by with top k smallest, an order by with top k largest, a minimum, and a maximum, wherein the main fragment comprises a search tree, and wherein the delta fragment comprises newly-written data optimized for writing and an auxiliary search tree associated with an unsorted dictionary of the delta fragment that provides a sort order over the unsorted dictionary;
    determining, by the one or more processors, using an eligibility verification, that a sorted dictionary at the column-oriented database is eligible for sorted direct access, wherein the eligibility verification comprises at least checking that the column-oriented database provides sorted access to the sorted dictionary and identifying that a first sort collation of the sorted dictionary matches a sorting type of a second sort collation of the query operator, the main fragment and the delta fragment being domain-coded to the sorted dictionary;
    reading, by the one or more processors, directly from the sorted dictionary a batch of sorted values comprising first values with respect to the sorted access to the sorted dictionary and skipping reading of remaining values, to avoid expensive operations comprising fully scanning the search tree and the auxiliary search tree and unpacking of a fragment at the column-oriented database, the first values comprising value identifiers in a vector result according to the sorting required in the query operator; and
    processing, by the one or more processors, based on the batch of sorted values read from the sorted dictionary, the query operator in order to provide a response to the query operator.

2. The computer-implemented method of claim 1, wherein the batch of sorted values from the sorted dictionary provides a response by a direct read from the sorted dictionary rather than determine the response using the sorting of the column of the column-oriented database and/or the scanning of the column of the column-oriented database, wherein the column is comprised in a main fragment of the column-oriented database.

3. The computer-implemented method of claim 2, wherein the column-oriented database comprises the main fragment storing the column of data values as a data vector, the sorted dictionary encoding the data values, and an inverted index.

4. The computer-implemented method of claim 3, wherein the column-oriented database comprises the delta fragment domain-coded to the sorted dictionary and a delta fragment inverted index.

5. The computer-implemented method of claim 1, wherein the query operator is detected as part of query optimization.

6. The computer-implemented method of claim 1, wherein checking that the column-oriented database provides access to the sorted dictionary and that a first sort collation of the sorted dictionary and a second sort collation of the query operator match comprises a call to a main fragment of the column-oriented database and a response to the call indicating the column-oriented database is eligible.

7. The computer-implemented method of claim 1, wherein reading from the sorted dictionary the batch of sorted values comprises storing a last, or a next, value read from the sorted dictionary to enable a second batch read of the sorted dictionary.

8. The computer-implemented method of claim 1, wherein reading directly from the sorted dictionary enables to avoid, in response to the query operator, a sort or a scan of a fragment at the column-oriented database.

9. A system comprising:
at least one processor; and
at least one memory comprising a program code which when executed by the at least one processor causes operations comprising:
detecting at a column-oriented database comprising a main fragment and a delta fragment, a query operator of a predetermined type requiring a sorting of a column of the column-oriented database and a scanning of the column of the column-oriented database in order to determine a response to the query operator, wherein the predetermined type of query operator comprises at least one of an order by, an order by with limit, an order by with top k smallest, an order by with top k largest, a minimum, and a maximum, wherein the main fragment comprises a search tree, and wherein the delta fragment comprises newly-written data optimized for writing and an auxiliary search tree associated with an unsorted dictionary of the delta fragment that provides a sort order over the unsorted dictionary;
determining using an eligibility verification, that a sorted dictionary at the column-oriented database is eligible for sorted direct access, wherein the eligibility verification comprises at least checking that the column-oriented database provides sorted access to the sorted dictionary and identifying that a first sort collation of the sorted dictionary matches a sorting type of a second sort collation of the query operator, the main fragment and the delta fragment being domain-coded to the sorted dictionary;
reading directly from the sorted dictionary a batch of sorted values comprising first values with respect to the sorted access to the sorted dictionary and skipping reading of remaining values, to avoid expensive operations comprising fully scanning the search tree and the auxiliary search tree and unpacking of a fragment at the column-oriented database, the first values comprising value identifiers in a vector result according to the sorting required in the query operator; and
processing, based on the batch of sorted values read from the sorted dictionary, the query operator in order to provide a response to the query operator.

10. The system of claim 9, wherein the batch of sorted values from the sorted dictionary provides a response by a direct read from the sorted dictionary rather than determine the response using the sorting of the column of the column-oriented database and/or the scanning of the column of the column-oriented database, wherein the column is comprised in a main fragment of the column-oriented database.

11. The system of claim 10, wherein the column-oriented database comprises the main fragment storing the column of data values as a data vector, the sorted dictionary encoding the data values, and an inverted index.

12. The system of claim 11, wherein the column-oriented database comprises the delta fragment domain-coded to the sorted dictionary and a delta fragment inverted index.

13. The system of claim 9, wherein the query operator is detected as part of query optimization.

14. The system of claim 9, wherein checking that the column-oriented database provides access to the sorted dictionary and that a first sort collation of the sorted dictionary and a second sort collation of the query operator match comprises a call to a main fragment of the column-oriented database and a response to the call indicating the column-oriented database is eligible.

15. The system of claim 9, wherein reading from the sorted dictionary the batch of sorted values comprises storing a last, or a next, value read from the sorted dictionary to enable a second batch read of the sorted dictionary.

16. The system of claim 9, wherein reading directly from the sorted dictionary enables to avoid, in response to the query operator, a sort or a scan of a fragment at the column-oriented database.

17. A non-transitory computer-reader medium comprising program code which when executed by at least one processor causes operations comprising:
detecting at a column-oriented database comprising a main fragment and a delta fragment, a query operator of a predetermined type requiring a sorting of a column of the column-oriented database and a scanning of the column of the column-oriented database in order to determine a response to the query operator, wherein the predetermined type of query operator comprises at least one of an order by, an order by with limit, an order by with top k smallest, an order by with top k largest, a minimum, and a maximum, wherein the main fragment comprises a search tree, and wherein the delta fragment comprises newly-written data optimized for writing and an auxiliary search tree associated with an unsorted dictionary of the delta fragment that provides a sort order over the unsorted dictionary;
determining using an eligibility verification, that a sorted dictionary at the column-oriented database is eligible for sorted direct access, wherein the eligibility verification comprises at least checking that the column-oriented database provides sorted access to the sorted dictionary and identifying that a first sort collation of the sorted dictionary matches a sorting type of a second sort collation of the query operator, the main fragment and the delta fragment being domain-coded to the sorted dictionary;

reading directly from the sorted dictionary a batch of sorted values comprising first values with respect to the sorted access to the sorted dictionary and skipping reading of remaining values, to avoid expensive operations comprising fully scanning the search tree and the auxiliary search tree and unpacking of a fragment at the column-oriented database, the first values comprising value identifiers in a vector result according to the sorting required in the query operator; and processing, based on the batch of sorted values read from the sorted dictionary, the query operator in order to provide a response to the query operator.

18. The non-transitory computer-reader medium of claim 17, wherein the batch of sorted values from the sorted dictionary provides a response by a direct read from the sorted dictionary rather than determine the response using the sorting of the column of the column-oriented database and/or the scanning of the column of the column-oriented database, wherein the column is comprised in a main fragment of the column-oriented database.

19. The non-transitory computer-reader medium of claim 18, wherein the column-oriented database comprises the main fragment storing the column of data values as a data vector, the sorted dictionary encoding the data values, and an inverted index.

20. The non-transitory computer-reader medium of claim 17, wherein the column-oriented database comprises the delta fragment domain-coded to the sorted dictionary and a delta fragment inverted index.

* * * * *